United States Patent [19]
Rentzepis

[11] 4,209,690
[45] Jun. 24, 1980

[54] INDUCED ABSORPTION ELEMENTS

[75] Inventor: Peter M. Rentzepis, Millington, N.J.

[73] Assignee: Bell Telephone Laboratories, Incorporated, Murray Hill, N.J.

[21] Appl. No.: 909,530

[22] Filed: May 25, 1978

Related U.S. Application Data

[63] Continuation of Ser. No. 633,127, Nov. 18, 1975, abandoned.

[51] Int. Cl.² ............................................. H01S 3/10
[52] U.S. Cl. .................................. 455/611; 332/7.51
[58] Field of Search .......... 332/7.51; 250/205, 213 A, 250/199; 331/94.52; 307/311, 312

[56] References Cited

U.S. PATENT DOCUMENTS

| | | | |
|---|---|---|---|
| 3,766,498 | 10/1973 | Brewer et al. | 332/7.51 |
| 3,842,372 | 10/1974 | Pao et al. | 332/7.51 |
| 3,864,020 | 2/1975 | Armstrong et al. | 350/157 |

FOREIGN PATENT DOCUMENTS 1514411 6/1969 Fed. Rep. of Germany ............ 330/4.3

OTHER PUBLICATIONS

Conway, "Light-Induced Modulation of . . . in CdS," Mar. 15, 1970, Jour. Appl. Phys., vol. 41, #4, pp. 1689-1693.
Schwartz et al., "Laser-Pulse Shaping Using . . . Behavior," 7/70, IEEE Jour. Quant. Elect., vol. QE6, #7, pp. 442-449.
Braerman, "Light-Induced Modulation of Absorption . . .," Oct. 1974, pp. 1-53, NTIS AD-A002 051.

*Primary Examiner*—Nelson Moskowitz
*Attorney, Agent, or Firm*—George S. Indig; Peter V. D. Wilde; Samuel H. Dworetsky

[57] ABSTRACT

A class of elements is dependent upon induced absorption for transmitted energy. Absorption is introduced by first pumping an active medium to produce a first excited state—generally an electronically excited state—whereafter the energy level of such excited state is reduced to a lower "metastable" excited state or by pumping directly to such metastable state. Increased absorption for radiation of a quantum energy corresponding with the difference between the metastable and some higher excited state occurs during the time interval that population of the metastable state is maintained. Elements may operate as extremely rapid shutters, switches, modulators, pulse sharpeners, etc.

33 Claims, 4 Drawing Figures

$S_0$ — GROUND ELECTRONIC STATE
$S_1$ — EXCITED ELECTRONIC SINGLET STATE
$T_1$ — FIRST EXCITED ELECTRONIC TRIPLET STATE
$T_2$ — SECOND EXCITED ELECTRONIC TRIPLET STATE
$v_0, v_1, v_2, v_3, v_4, v_5$ — VIBRATIONAL LEVELS

INDUCED ABSORPTION ELEMENTS

This is a continuation of application Ser. No. 633,127 filed Nov. 18, 1975, now abandoned.

BACKGROUND OF THE INVENTION

1. Field of the Invention

The invention is concerned with apparatus and systems in which light or other radiant energy is modified as, for example, by switching. Contemplated systems include communications, computers, etc.

2. Description of the Prior Art

A significant part of modern technology is concerned with apparatus and systems in which radiant energy is in some way altered during transmission through a medium. Communication systems, for example, may make use of a carrier wavelength of radiation energy which is somehow altered in analog or digital manner so as to represent intelligence. An increasing part of technology depends upon computer systems of increasing sophistication which, again, generally depend upon variation of some characteristic of energy-electromagnetic energy—with complex computations being the cumulative result of a multiplicity of such variations, possibly in discrete control elements. Both types of systems have, in the past, depended on relatively low frequency energy, perhaps dc, while later developments make increasing use of higher and higher frequency energy. This trend has gained impetus through the invention and development of the laser oscillator, variations of which may now produce cw or pulsed radiation at wavelengths from the far infrared through the visible spectrum and into the ultraviolet.

Many of the now realized implications of the laser oscillator were recognized at its inception. These include increased bandwidth and rapidity of both introduction and extraction of information. Exploitation necessarily suggest a variety of circuit elements—some operating as shutters, some as switches, some as digital modulators, etc. Control elements suggested in response to this recognized need have operated on virtually every physical principle known. These include magnetooptic interactions, such as Faraday rotation and induced birefringence effects; electrooptic effects, including—e.g., Kerr effect or Pockel's effect. Elements may constitute pulse generating means, some internal to the laser, itself, as by Q-switching, mode-locking, cavity dumping; and some external to the laser, for example, by use of saturable absorbers. A variety of devices depend as well upon acoustooptic effects. Dependence upon a variation in index of refraction due to a travelling or stationary elastic wave may, for example, result in physical displacement of energy to fill a number of operational needs.

An observed phenomenon which received considerable scientific acclaim, known as induced transparency, is described in *Physical Review Letters*, 18, 908 (1967) by S. L. McCall and E. L. Hahn. The effect, experimentally observed as self-induced coherent amplification, may take the form of transmission of a pulse of radiant energy through an excited medium, resulting, first in an initial absorption thereby reducing pulse length, with subsequent stimulation resulting in amplification of the now shortened pulse.

SUMMARY OF THE INVENTION

In accordance with the invention, there is described a new class of apparatus and systems capable of performing a wide range of functions. The invention depends upon a mechanism hereinafter denoted "induced absorption". The term correctly implies introduction of, or increase in, absorption within a medium for one or more specified wavelengths of energy. It is the nature of the mechanism that useful variation in absorption level may be introduced over time intervals sometimes as short as picoseconds or less—perhaps as short as femtoseconds. Absorption values so changed may be on a digital or analog basis. Operations performed may be that of switching and modulating, for example, for interposition of variations representing information. Either function may be adapted to a variety of purposes as, for example, to create a pulse stream from cw radiation or for performing an elemental computation process. Readout, which may also involve the inventive mechanism, may also take a variety of forms—e.g., visible display or detection by any of many means. Generally, any detection system that may sense a variation in radiation amplitude may be utilized.

While the mechanism upon which the invention depends is to be distinguished from induced transparency, certain of the media utilized may, by mechanism necessarily associated with induced absorption, produce useful radiation. Inventive embodiments contemplate utilization of such radiation, albeit in a manner ancillary to the fundamental induced absorption mechanism. A variety of functions may be served by departure from simple single absorption incidents or quanta. So, for example, induced absorptions at different levels may result in device operation which simultaneously or sequentially results in separately identifiable variations. Examples are multilevel devices which simultaneously modulate different wavelengths of transmitted energy, as well as devices which may modulate subsequent portions of energy so as to result, for example, in pulse sharpening. Multiplexing may be accomplished by these or other described mechanisms.

While discussion is generally in terms of radiant energy in the visible and near visible spectra, principles of the invention apply equally well to longer wavelength energy including, not only the far infrared, but also that in the microwave range as well as to shorter wavelengths as, e.g., vacuum UV.

Embodiments of the invention as noted all depend upon the mechanism of induced absorption. This phenomena, not, so far as is known, described in the technical literature, rely upon population, or at least increased population, of a metastable energy state, with absorptions corresponding with excitation from such metastable state to a permitted higher excited energy state by traversing radiant energy of a quantum level corresponding with this energy difference. In the usual embodiment, in accordance with the invention, population of the metastable state is a two-step process consisting of (1) pumping to a first excited state, and (2) stimulation to the metastable or second excited state. While both first and second excited states may represent electronically excited states relative to an initial unpumped energy level (usually a ground state), induced absorption quanta may depend upon stimulation between vibrational levels in a particular multiplet or, more usually, between an electronically excited state and an elevated vibrational level within the ground state multiplet.

Excitation, that is, pump excitation, may take any of many forms including those used in the laser art. So, for example, the pump may consist of a light source, or it may take the form of an electric field or other means for producing collision excitation. In general, population of the metastable or second excited state is brought about by stimulation, again, sometimes in the manner practiced in the laser art. An exemplary embodiment may, therefore, utilize a first light pulse for pumping to the first excited state followed by a second light pulse of laser quantum energy for stimulating to the metastable state. Alternative procedures may involve simultaneous excitation and stimulation as, for example, by means of a broad pulse containing both energy quantum levels; or, assuming appropriate lifetimes, population of the metastable state may occur by natural relaxation from the first excited state or by direct pumping from a lower state without need for stimulation. Simultaneous or sequential modification of energy of differing quantum levels within the same medium is usually accomplished by deliberate stimulation or pumping to different metastable levels, for example, to different excited vibrational levels of the ground state multiplet. Depending on energy level characteristics of the medium, variation may be introduced by use of different first excitation levels, possibly by use of different vibrational levels within the associated multiplet for example, by time selection dependent on relaxation or by different pump quanta. Multiple photon events may serve in this or similar manner as well.

DETAILED DESCRIPTION

1. Terminology

Figure 1:
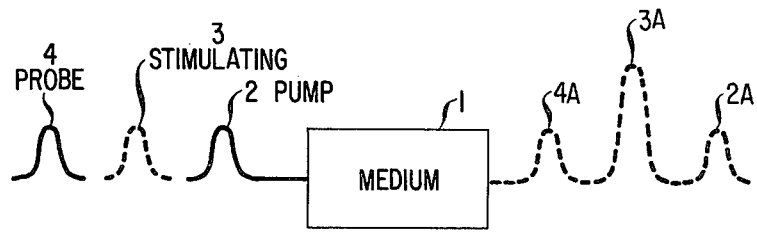
FIGS. 1 and 2 are schematic representations of systems dependent upon the inventive teaching to which reference is made in discussing a variety of embodiments.

It has been indicated that inventive embodiments depend primarily upon induced absorption-whether digital, or analog. Since, however, many media suitable for practice of the invention are amplifying media as well, it has been decided for pedagogical purposes and for consistency with related writings concerned with, for example, laser technology, to adopt language descriptive of the latter. Accordingly, the term pump or pump pulse (this may be cw or pulsed) is used in the laser sense of producing an increase in energy level. In the inventive teaching, therefore, pumping is the process by which energy, e.g., at a ground state level is increased to what has been referred to as a first excited state (ordinarily within the multiplet of the highest energy state to be attained). As discussed, pumping may well involve any of the many variations considered in the laser art as, for example, multiple photon effects—e.g., two photon or second photon—as well as radiationless transitions to an excited state from which stimulation subsequently takes place.

Following elevation of an energy state to some level by whatever mechanism, there may be stimulation to what may be referred to as a second excited state or metastable state. Again, therefore, a term, in this instance, stimulation or stimulating pulse, is used in the sense of the laser technology in which it brings about a decrease in energy level from some elevated level, perhaps the first excited state. While the term metastable state can be used to characterize any excited state, in this context it is utilized to designate that state or states resulting in the induced absorption which is a necessary characteristic of every embodiment of the invention. Embodiments may as noted, involve direct pumping to the "metastable" state.

Terminology referring to the pulse or, more generally, to the radiation which is somehow modified, by means of the induced absorption of the invention to some extent depends upon the intended use. In general description, it is convenient to refer to this radiation to be modified as the probe. This probe may take the form of pulsed or continuous (cw) radiation. The "probe" may take any of a variety of forms, for example, as a carrier in a communication system. Contemplated embodiments may also take a form in which the probe is utilized to determine the presence or absence of a stimulating pulse. The inventive teaching may involve mere conversion of the probe from cw to a pulse stream.

Medium or active medium refers to the material within which absorption is induced by the mechanism described. Media appropriate for the practice of the invention need not be traditional active media in the laser sense—that is, need not be amplifying. In fact, certain of the embodiments specifically described utilize media in which stimulation results in a decrease in energy through a radiationless process. Media useful for the practice of the invention may be liquid, vapor, or solid. Media of any such state may be charged or uncharged—i.e., may be considered as plasma.

Other language not specifically described in this section is that of the laser art so, for example, cw, as distinguished from pulse, is intended to describe continuous wave or, more simply, radiation generally of a time duration greater than that produced by most pulse sources.

2. The Drawing

FIG. 1 is in schematic form. For simplicity, all forms of incoming energy are depicted as pulses. Although, as noted, it is contemplated that one or more may not be pulses, that they may be cw and, further, that there may be a combination of functions or omission of stimulation so that pump and stimulation may be replaced by but a single energy input. It should be noted also that, while the schematic representation suggests both incoming and outgoing radiation, certain of the energy forms may be otherwise. For example, it is well known that conventional lasers may operate by means of electric field pumps or ion collision; and such pumps are appropriate also for the practice of the invention.

Referring specifically to FIG. 1, the active medium or, more simply, the medium, is shown as body 1. Incident on body 1, there is, in succession, a pump pulse 2, an optional stimulating pulse 3, and a probe pulse 4. Outgoing energy is depicted as pulses 2A, 3A, and 4A. Pulse 2A is depicted in phanton. Since pulse 2 is generally representative of the energy which produces the relevant first excited state, or alternatively, the metastable state, it is expected that its amplitude will be substantially reduced or, in fact, that it may even be undetectable. It is, in fact, one of the significant characteristics of the invention that measurable and, therefore, effective induced absorption may be brought about by the use of very weak pump energy—orders of magnitude less than that required to result in amplification in a laser medium. Pulse 3A corresponding in general relative position with stimulating pulse 3, is, again, shown in phantom, and is depicted as of substantially increased amplitude. It is, of course, not necessary that such stimulating pulse be of increased amplitude or, indeed, that it be detected at all as part of the output. In a particular embodiment of the invention, the medium chosen is truly amplifying, either in the usual laser sense or by virtue of an innovative pumping means where pumping takes place from a metastable to an excited state (rather than from a ground state). In such embodiment, pulse 3A is amplified as shown, and such amplification may perform a useful function in accordance with the invention. In other embodiments, pulse 3A may be reduced in amplitude or may be undetectable. This may occur where the reduction in energy from the relevant excited state to a metastable state takes place through one or more radiationless processes. There may be a radiationless transition involved in an amplifying medium as well and by appropriate timing, the effect of any such radiationless transitions may be utilized to advantage to produce time varying induced absorption. It is possible—quite likely—that the wavelength of any pulse 3A will be different, generally longer, than that of pulse 3.

Outgoing pulse 4A, also depicted in phantom, indicates only that there is a time slot corresponding with the incoming probe pulse 4. Induced absorption may be such as to eliminate or substantially reduce the amplitude of pulse 4, or one or more stimulating pulse/s 2 may be utilized to shape pulse 4 so as to steepen leading and/or trailing edges. As is discussed, any such variation may be utilized to impose information or other desired modification on incoming cw, quasi-cw, or pulsed radiation, any of which is schematically represented by probe pulse 4.

Figure 2:
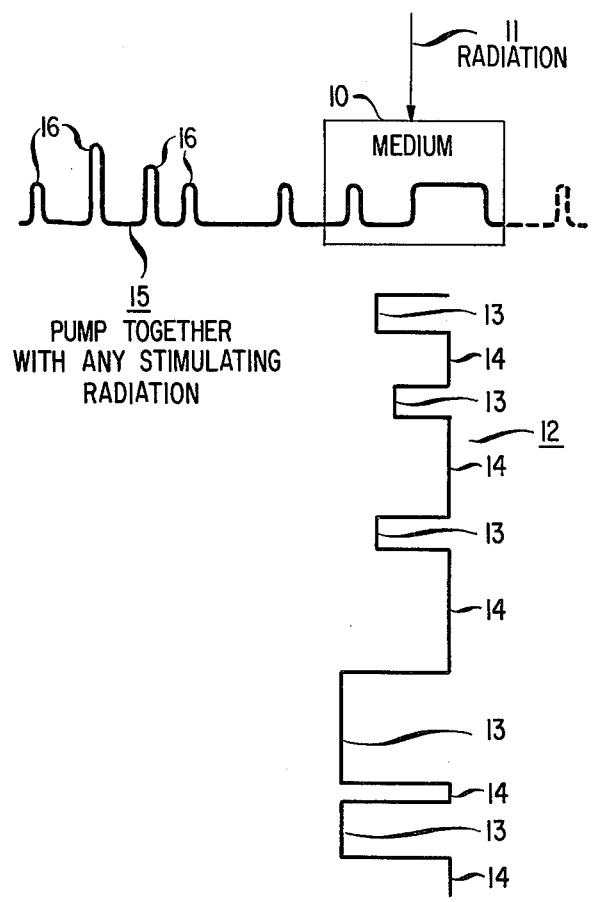

FIG. 2, again in schematic form, is representative of a species of the invention. Again, there is depicted a medium 10 which is excited, this time by means of a cw source 11 which may, for example, be a cw YAG-neodymium laser. The cw energy produced by source 11, in travelling through the medium in a direction depicted in FIG. 2 as vertical, results in an output stream 12 characterized by a series of pulses 13 and troughs 14. The modulation resulting in the conversion of the cw energy produced by source 11 into stream 12 is introduced by means of incoming energy stream 15. Stream 15 is made up of pulses 16 which, as depicted for pedagogical purposes, are of varying amplitude and spacing. This representation is utilized to show the possibility of either digital or analog modulation, either of which may take the form of amplitude, phase, or frequency. Pulses 16, however constituted and of whatever form of energy, serve the function of stimulating pulses and or pump pulses, such as pulses 3 and/or 2 of FIG. 1.

Figure 3:
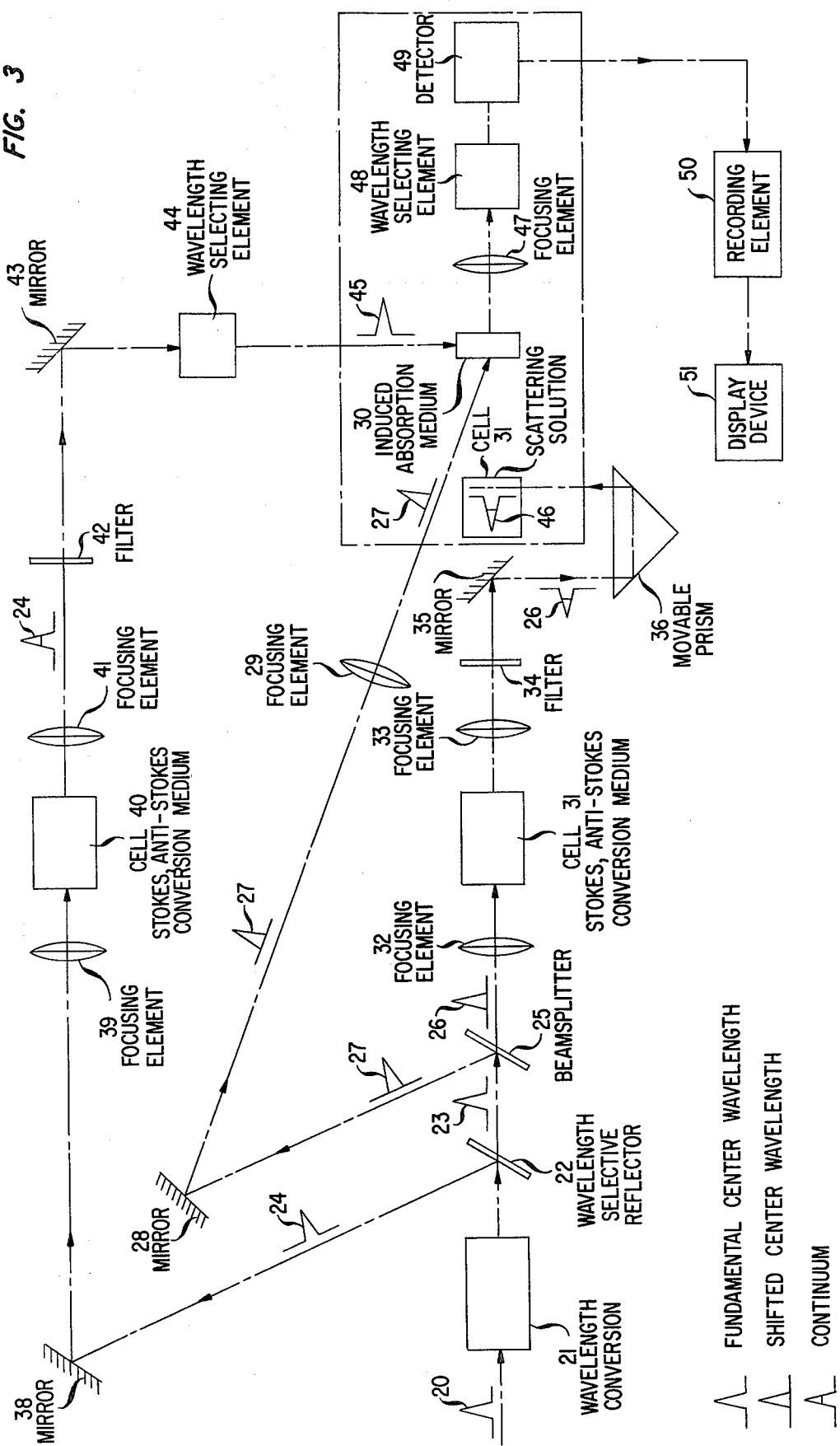
FIG. 3 is a schematic representation of a specific arrangement to which reference is made in the Detailed Description describing actual elements, materials, and other parameters which may be utilized in accordance with the invention.

FIG. 3 is a detailed schematic representation of an experimental arrangement which may be utilized to demonstrate certain of the operational parameters of various of the inventive embodiments. It is discussed in terms of specific radiation sources, detectors, and other elements, and, therefore, should be considered as exemplary only.

Reading from left to right, the first symbol shown 20 is representative of a single pulse of 1060 nm wavelength radiation as produced by a mode-locked YAG-neodymium laser. For illustrative purposes, such a pulse may be of time duration of about 10 picoseconds and of a peak amplitude of 60 megawatts. Such pulse 20 is made incident upon a KDP (potassium dihydrogen phosphate) wavelength coversion element 21 which operates as a second harmonic generator (SHG) to produce 530 nm energy. Mirror 22 is a reflecting dichroic mirror of such nature as to transmit 530 nm radiation (depicted as pulse 23) while reflecting unconverted 1060 nm radiation depicted as pulse 24. Upon being transmitted by mirror 22, pulse 23 is split into two 530 nm center wavelength pulses 26 and 27 by beam splitter 25. Following pulse 27, it is thereafter reflected by completely reflecting mirror 28 and is focused by focusing means 29 and, finally, is made incident as a 2 mm diameter beam on cell 30 which contains the active medium or the "induced absorption medium" for producing induced absorption. For an exemplary arrangement, an aspect of which is discussed in Example 1, cell 30 contains a solution of DODCI (saturated absorbing dye 3,3' diethyloxadicarbocyanine iodide). The effect of pulse 27 on cell 30 is to pump the active medium therein contained to a first excited level which, in accordance with Example 1, is a level within the singlet multiplet $S_1$. Pulse 26 is focused on cell 31 by focusing means 32 during the same time interval. Cell 31 contains a medium which, through a large number of Stokes and anti-Stokes transformations, effectively converts the band of energy within pulse 26 from that evidencing the discrete lines characteristic of the specific laser source to a virtual continuum. The thus modified pulse, upon departing from cell 31, is refocused by focusing element 33 and is passed through filter 34. The purpose of filter 34 is to block energy centering about the fundamental laser wavelength of 1060 nm. (Again, as is so often true of element design and apparatus arrangement in this Figure the purpose oftentimes is concerned with experimental rather than practical needs. So, in this instance, elimination of 1060 nm energy facilitates identification of probe as distinguished from pump energy at a detector). The continuum pulse is redirected by mirror 35 so as to be made incident upon movable prism 36 which redirects the pulse to a cell 37 which contains a colloidal suspension (e.g., milk and water) to produce a diffuse image 46 which may be detected by cell 30 at a direction orthogonal to the direction of incidence of pulse 26 on cell 37. Pulse 24, representing the major part of the residual 1060 nm energy, is simultaneously reflected by mirror 38 and is focused by focusing means 39 on cell 40. Cell 40, like cell 31, is designed to convert energy within the pulse envelope from the discrete emission lines associated with the laser source to a continuum. An effective Stokes, anti-Stokes transformation medium for such center frequency is benzene, and this material is used in Example 1. The continuum pulse, upon leaving cell 40, is again focused by focusing element 41 and is passed through a filter element 42 designed to block energy centering about the second harmonic wavelength of 530 nm (again, primarily to expedite separation for precise scientific observation) and the so delineated pulse is directed by mirror 43 through wavelength selecting element 44 so as finally to be made incident upon cell 30.

Wavelength selecting element 44 may be a simple monochromater, and such was used in Example 1. The pulse, now identified as pulse 45, is the stimulating or gating pulse to which reference is made elsewhere in this description. The image, now represented as pulse 46, now serves as signal or other energy to be processed by cell 30. Upon passing through cell 30, any energy transmitted is focused by focusing means 47, is passed through wavelength selecting element 48, and is finally made incident on a detector 49 which in the Figure is the photo surface of a silicon vidicon television camera tube. The signal is then stored on a magnetic video disc 50 and the stored television field is displayed at will continuously or discontinuously on a television monitor 51.

It should be emphasized that many of the specific details of FIG. 3 are designed for relatively sophisticated scientific purposes. Depending upon use, any number of elements may be omitted and so, for example, an operating system may have no need for complete separation of pump image and stimulating pulses; may operate satisfactorily without Stokes and/or anti-Stokes transformations; and may require no wavelength selection either by elements such as 44 or 48. Video disc 50 and television monitor 51 would serve no purpose in a typical communication system in the absence of a desire to maintain a permanent record. Many of these elements are designed to afford the flexibility, particularly in wavelength, but also in relative time, to permit as much information extraction as possible. Significant information includes inter alia, specific vibrational levels, lifetimes, the nature of various radiationless and multiphoton events, etc.

Figure 4:
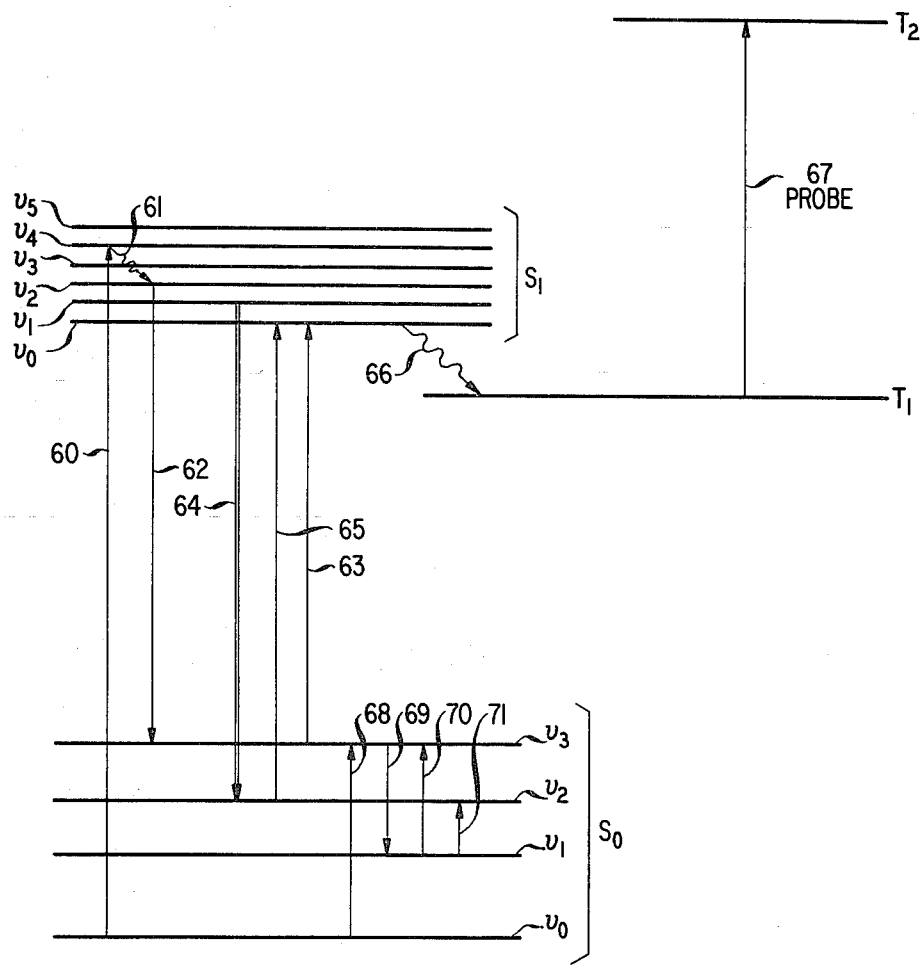
FIG. 4 is a generalized energy diagram including representations of a variety of events useful in the practice of the invention.

FIG. 4 is a generalized energy diagram designed to illustrate many of the energy states, e.g., both electronic and vibrational; both singlet and triplet which may be responsible for working embodiments in accordance with the invention. In broad outline, the diagram consists of a ground state multiplet $S_0$, including four vibrational levels, $\nu_0-\nu_3$, with $\nu_0$ representing the lowest energy level depicted, and excited multiplet $S_1$ consisting of six vibrational levels $\nu_0-\nu_5$, again with $\nu_0$ representing the lowest vibrational level of that multiplet. In addition to the two states in the same multiplicity, there is also depicted a triplet state $T_1$ of a somewhat lesser energy than $S_1$, together with an elevated triplet state $T_2$, with $T_2$ representing an energy level above that of $S_1$. A variety of events are shown. While such events all occur, they do not necessarily all occur in any one specific medium. Media suitable for any given set of events are discussed in somewhat greater detail, for instance, in the Examples.

Every embodiment in accordance with the invention, necessarily involves a pump, be it optical, field induced, collision induced, etc., and this results in an elevation in energy level from a populated state to an unpopulated or lesser populated state. Excitations, as well as other transitions, are depicted by use of the symbols conventionally used. Straight arrows depict induced changes in state while wavering arrows depict natural relaxation processes. Accordingly, an exemplary pump from a lowest ground state level $S_0^{\nu 0}$ to an upper vibrational level in the first excited electronic state $S_1^{\nu 4}$ is depicted by arrow 60. Illustrative of typical excited states, lifetime at the $S_1^{\nu 4}$ level is relatively short and there is a radiationless process depicted by wavering arrow 61 which results in population at the $S_1^{\nu 2}$ level. Stimulation energy of a quantum equal to the energy difference between $S_1^{\nu 2}$ and $S_0^{\nu 3}$ states results in reduction of energy and, therefore, population of the latter level. This is depicted by straight arrow 62. Population of the $S_0^{\nu 3}$ level provides a mechanism for absorption of energy, for example, of a quantum level equal to the energy difference between $S_0^{\nu 3}$ and $S_1^{\nu 0}$. This absorption is represented by arrow 63. Alternatively, and as a process which may be permitted simultaneously or sequentially in the same medium, there may, prior to stimulation, be a relaxation from $S_1^{\nu 2}$ to $S_1^{\nu 1}$ (a transition which typically may occur in a small number of picoseconds) which may, in turn, be stimulated to any lower level, for example $S_0^{\nu 2}$ as shown by arrow 64. Population of this latter ground state vibrational level, again, provides absorption mechanism which, for a suitable quantum, may take the form of excitation to $S_1^{\nu 0}$, as depicted by arrow 65. For illustrative purposes, 62 is shown as a single line arrow, while 64 is shown as a double line arrow. The latter is the symbol conventionally used for stimulated coherent radiation. Alternatively, and not depicted specifically for singlet-singlet interactions, stimulation may result in radiationless transition to an $S_0$ state.

FIG. 4 includes a righthand section depicting a singlet-triplet transition. Such transitions which occur spontaneously, typically to result in relatively long triplet lifetimes—e.g., of the order of milliseconds—are here illustrated by wavering arrow 66 depicting a radiationless transition from singlet state $S_1^{\nu 1}$ to some undesignated vibrational level in triplet state $T_1$. The absorption mechanism thus afforded for quantized energy sufficient to populate an undesignated vibrational level within the excited state triplet multiplet $T_2$ is illustrated by straight arrow 67.

Also depicted on FIG. 4 is a series of transitions as among vibrational levels in the ground state multiplet $S_0$. Here a pump 68 is utilized to populate the upper thermal state $\nu_3$ and stimulation is to $\nu_1$ by a stimulating pulse containing such quantum energy is depicted by arrow 69. Absorptions thus introduced may correspond with a $\nu_1-\nu_3$ transition (arrow 70) or a $\nu_1-\nu_2$ transition (arrow 71). Absorptions within the ground state multiplet may typically be for infrared radiation or still lower energy such as that in the microwave range.

Alternatively, population of $S_0^{\nu 3}$ by a low energy quantum results in direct population which may afford an absorption mechanism for higher energy radiation, for example, to $S_1^{\nu 0}$ as schematically represented by arrow 63.

3. General Design Considerations

A variety of embodiments were discussed in the Summary of the Invention. As noted, all embodiments rely on increased population—generally of an unpopulated level—thereby providing an absorption mechanism for energy of such quantum level as to populate a higher permitted state. Such increased population state or level, for convenience designated as metastable state, may be populated in a variety of ways. A very large array of embodiments, all necessarily involving population of such metastable state, may depend upon a number of ancillary considerations. For example, population of the metastable state may be by direct excitation as, for example, between vibrational levels of the ground state multiplet or between multiplets, or by some energy reduction event from some higher level. Much of the discussion has been in terms of a singlet photon pump form to some excited state with stimulation to the desired metastable state, again, by means of a single photon event. Stimulation may, depending on a variety of considerations, such as the nature of the medium, the stimuation energy level, etc., result in emission as by gain; sometimes coherent gain. Alternatively, reduction from a first excited energy state to the desired metastable state may involve or be due solely to one or more relaxation events. Again, relaxation may or may not involve measureable electronic energy output, whether in the visible or not.

The same sequence—i.e., pump, stimulation, and, finally, absorption, may take place as among levels of the same multiplet, e.g., vibrational levels of the ground state multiplet. Where relaxation is involved either as part of a multiple process or in conjunction with a separate stimulation, it is possible to time-select wavelengths of absorbed or detectable energy, in the latter instance, of, for example, coherent light energy which may be utilized as ancillary to a first absorption. Generally, separation, as among levels of a given multiplet, are but a small number of picoseconds apart so that time selection becomes demanding.

Such selection is discussed in conjunction with Example 7. It may be that with or without such time-selection for emission wavelength, absorption will be but for one identifiable quantum level. However, the essence of the separable excited state vibrational levels (or, alternatively, the separable vibrational levels of the ground state multiplet) suggests the possibility of absorption of differing wavelengths. In fact, such has been observed and this is the mechanistic explanation for the bandwidth of observed absorption wavelengths reported in the Examples. As is to be expected, absorptions vary in strength.

At least one example deals with a absorption for a shorter wavelength than that of either a pump of stimulation and, consequently, must be ascribed to a multiphoton event. Multiphoton events, either with real absorptions or with virtual absorptions, are usefully employed at any level—i.e., pump; stimulation, where used; as well as at the probe or signal level. As is the experience with workers familiar with multiphoton pumping, particularly where real absorptions are involved, quanta emitted are oftentimes of lesser value than the cumulative pump indicating the essence of radiationless processes.

Multiphoton processes, as well as identifiable levels within given multiplets, permit a variety of devices in which probe wavelength or, alternatively, absorption depth for a given wavelength, may be dependent upon other parameters—e.g., time selection, electric or magnetic field, solute concentration—where a liquid or gas cell is employed as the active medium, etc.

Processes of the invention lend themselves directly to digital use. Experimental results, however, verify expected variants; so that pulse streams have been produced from cw streams. Similarly the character of amplitude variations, whether pulse or amplitude variations in a cw stream; whether previously present or induced, may be varied as to amplitude, length, position, or wavelength. Modulation on an amplitude, frequency or phase basis, as well as multiplex systems depending on any one or more of these variants, are, therefore, contemplated.

Most systems discussed involve singlet events, whether from one multiplet to another or within a single multiplet. Such events may take place within traditional laser media where gain is to be expected; within media not generally classified as active laser media where gain results due to events including pumping from a metastable state within the few picosecond lifetimes characteristic of such state. Such emissions, from whatever type of medium, may be utilized as ancillary to the absorption which are characteristic of every embodiment of the invention.

Singlet to triplet transitions may be utilized in a particular category of elements. Since transitions from a triplet state to a singlet state are not permitted from a quantum mechanical standpoint, lifetimes are characteristically quite long—typically of the order of many milliseconds. The absorption so introduced may, therefore, be manipulated in certain ways not practical for singlet to singlet transitions. Time measurements may be based on amplitude of absorption realized as dependent upon the interval between pump and probe. While the increased lifetime is a limitation on operation and precludes meaningful picosecond or even nanosecond modulation, the absorption may be utilized for the entirety of a pulse stream. Variants discussed in conjunction with singlet to singlet events are generally possible also with triplet to triplet events. These include multiple photon events at any of the two or three energy inputs, a variety of radiationless events with or without associated stimulations, etc.

4. Examples

EXAMPLE 1

The arrangement of FIG. 3 was utilized with a single pulse 20 produced by a mode-locked YAG-neodymium laser. As there described, a portion of the pulse is harmonically doubled to a wavelength of 530 nm by element 21; in this instance, a cell of KDP. An image of broadened wavelength content is produced by passage through a $D_2O$ cell. As also there discussed, a combination of a portion of the reflected 1060 nm pulse is passed through a cell 40, in this instance a cell of benzene, to produce a continuum—from which relatively narrow band stimulating energy is selected. Stimulation, as well as absorption, are observed for center frequencies of stimulation energy of from about 560 to 580 nm. Proper adjustment of the movable prism 27 to bring the stimulation pulse and the image into synchronism, and variation of the image center wavelength results in strong observed absorption from 570 nm to 590 nm but in still measurable and, therefore, device useful absorption over the somewhat broader range of from 540 nm to 610 nm. It is observed that the relative amount of both absorption and emission are strongly dependent upon the concentration of DODCI in the induced absorption medium. Concentrations of from $10^{-3}$ molar to $10^{-6}$ molar of DODCI in a variety of hydrocarbon solvents—e.g., benzene cyclohexane result in measurable absorption. Stimulated emission is perceptible only at levels above about $10^{-5}$ molar.

DODCI is a particularly interesting medium, since, as indicated, it results in significant amplification for appropriate concentration, as well as in the absorption which is characteristic of all embodiments of the invention. For high concentration, that is, for $10^{-3}$ molar, the amplification represents a gain of approximately $10^3$. For the laser power level indicated in the Figure description—i.e., about 60 megawatts—and for a pulse length of approximately 10 picoseconds, the extinction ratio is sufficient to block at least 99 percent of transmission with such absorption level dropping off to about 10 to 20 percent for the very low concentration levels indicated. For absorption wavelengths outside the narrow range of from 570 to 590 nm but within the broad range of from 540 to 610 nm, the extinction is less so that at the extremes a maximum of perhaps 50 percent is attained.

EXAMPLE 2

An arrangement similar to that described in Example 1 makes use of a solution of anthracene. Pump energy is provided by doubling and redoubling from YAG-neodymium as in Example 1 through KDP (potassium dihydrogen phosphate) as in Example 1 and thereafter through ADP (ammonium dihydrogen phosphate). As in Example 1, pump energy, now at a center wavelength of approximately 265 nm, produces the excited state (first excited state) with an image serving as probe being made up of a pulse of broadened bandwidth. Stimulated emission is observed as a relatively weak 360 nm pulse for high anthracene concentration. Variation of the transmission wavelength by a monochromator results in the observation that absorption comparable in extinction ratio to that of Example 1 occurs over the approximate band of from 290–320 nm.

EXAMPLE 3

Still using the arrangement of FIG. 3 but with a cell containing a solution of cryptocyanine in ethylene chloride (concentration range from $10^{-6}$ to $10^{-2}$ molar) and with but a single non-linear harmonic generator of KDP yielding 530 nm energy from incident 1060 nm energy produced by a mode-locked YAG-neodymium laser, pumping is effectively carried out at 694.3 nm (selected by means of a monochromator) from the white pulse produced from passage through a benzene cell yielding the various Stokes and anti-Stokes transformations. Probing the medium at a wavelength of from 790 to 820 nm again produces extinction from virtually 100 percent to about 10 percent for decreasing concentration of cryptocyanine. Emission at 550 nm at a peak gain of perhaps $10^3$ indicates an effective multiphoton—perhaps two photon—event.

EXAMPLE 4

Use of the apparatus of Example 2 including the redoubling ADP element with a medium of benzophenone in benzene (concentration range from $10^{-5}$ to $10^{-1}$ molar) results in absorption comparable to that reported above over the range of from 360 nm to 410 nm. Frequency scanning of the output reveals emission most pronounced over the range of from 358 to 590 nm.

EXAMPLE 5

Substitution of a thin cleaved crystal of anthracene (a few mils thick in the image detection direction and 1 cm in the long dimension corresponding with the stimulation direction) for the solution of Example 2 yields results comparable to those described for the higher concentration solutions.

EXAMPLE 6

Again, a single crystal of benzene substituted for the solute-solvent cell in Example 4 yields comparable results both as to absorption and emission for the conditions there stated.

EXAMPLE 7

This Example involves use of a medium of rhodamine 6 dissolved in ethyl alcohol (concentration from $10^{-2}$ to $10^{-5}$ molar). It was previously known that the material as an active laser medium evidences a large number of distinguishable vibrational levels in the excited state multiplet $S_1$ (that portion of the energy diagram of FIG. 4 concerned with electronic excitations is diagrammatically representative of such material). Pumping, as in Example 1 is by a YAG-neodymium mode-locked laser with its output harmonically doubled to 530 nm by a KDP element. Probing is carried out as described in Example 1, again using a $D_2O$ cell which performs its function of producing a "white" pulse through Stokes and anti-Stokes conversion. Stimulation is, again, by injected pulse which passes through a benzene cell to increase its wavelength content. Measurement is conducted for different positions of the movable prism with positions differing one from the other so as to produce incremental increases in path length of a few picoseconds, thereby differentiating as among five of the vibrational levels in the $S_1$ multiplet as depicted in FIG. 4. The total path length difference introduced at the extreme positions of the movable prism is approximately 30 picoseconds corresponding with the total relaxation time from $\nu_5$ to $\nu_0$ of the $S_1$ multiplet. At each position of the movable prism, the stimulating pulse wavelength is scanned by means of the wavelength selecting element. It is observed that peak absorption occurs at wavelengths differing one from another in accordance with the prism position and each corresponding with the quantum energy represented by the difference between the appropriate vibrational $S_1$ level and the upper ground state vibrational level $\nu_3$ of $S_0$. A complete scan of output from the induced absorption cell results in gain at a characteristic emission frequency for each of the vibrational levels $\nu_5$ through $\nu_0$ of the $S_1$ multiplet but, as expected, that for $\nu_0$ is most pronounced evidencing a gain approximately $10^4$ times greater than the others observed.

EXAMPLE 8

A cell containing a solution of benzophenone in benzene (concentration about $10^{-5}$ molar) is used to illustrate an arrangement in which natural relaxation from the excited singlet state $S_1$ to a triplet state $T_1$ results in induced absorption corresponding with a $T_1$-$T_2$ quantum. The apparatus arrangement is similar to that utilized in Example 4 with a pump operating at a wavelength of about 355 nm but, since population of the concerned metastable state is by relaxation no provision is made for a stimulating pulse. Relaxation to the triplet state takes approximately 7 picoseconds. The lifetime at the $T_1$ level is about 5 milliseconds. With this relatively long lifetime, a number of exemplary operations are possible so, for example, with sufficient population at the $T_1$ level, a single pump pulse may suffice to introduce an absorption for a large number of pulses in a train or, alternatively, in a relatively long cw stream. To this end, pumping is carried out with a ruby laser operating at a wavelength of 694.3 nm with mode-locking resulting in a pulse length of about 8 picoseconds with peak power of about 800 megawatts. Use of apparatus otherwise as described in Example 4 results in a white pulse representing a continuum from about 350 to about 600 nm. Frequently scanning results in substantially total extinction over the entirety of the described probe continuum supporting the prior observation of a large number of vibrational levels at the $T_2$ triplet excited state.

The examples set forth are selected from a very large number of experiments fairly representative of the effect of differing active media, as well as singlet-triplet interactions, etc. Additional experiments have established the universality of induced absorption. Pumps may take any of a variety of forms including all known lasers, whether light pumped, field pumped, or collision pumped, etc., depending on the nature of the active medium. While the examples generally make use of white pulses, and this is particularly suitable for experimental purposes, elimination of Stokes, anti-Stokes conversion elements in no way affects operation of the inventive mechanism for appropriate specific lines of coherent sources. Again, for experimental purposes, scientific observation is best served by use of coherent sources both for pump and stimulation. Actual apparatus may utilize incoherent sources with detectors arranged to sense transmission variations introduced by virtue of specific induced absorptions. Experiments have established other operational modes so, for example, time selection and/or mixed media as examples may be utilized to tailor leading and/or trailing edges of probe pulses and, indeed, such combination may result in shorter pulses than are normally obtained from mode-locked lasers.

As discussed in connection with a portion of FIG. 4, operation as between vibrational states of the $S_0$ (ground state multiplet) in a manner analogous to operation between states of different multiplets results in operation at infrared and longer wavelengths. In fact, energy separations between such vibrational states are sufficiently small to admit operation in the microwave range. For experimental investigations, or for other reasons where it is desired to have a virtual continuum of wavelengths to permit free selection, cells such as hydrogen which more effectively (than, e.g., $D_2O$) resulting in Stokes and anti-Stokes transformations at long wavelengths are usefully employed. The exemplary relevant portion of FIG. 4 showing first pumping from $\nu_0$ to $\nu_3$ of $S_0$ with subsequent operation (stimulation and absorption) as between $\nu_3$ and $\nu_1$ and $\nu_1$ to $\nu_3$ or to $\nu_2$ for the ethyl alcohol system results in absorptions of 881 cm$^{-1}$ and 2981 cm$^{-1}$ respectively. Such system may also result in stimulated emission at a center wavelength of 5600 nm.

What is claimed is:

1. In a communication system an apparatus including an element comprising an active medium, said active medium being characterized by quantum mechanical energy levels, together with first excitation means for exciting said active medium so as to increase population at at least one elevated quantum mechanical energy level to a population above that evidenced by the said medium when the medium is at thermodynamic equilibrium, the increased population at the said elevated level resulting in a "metastable state", said metastable state having an associated population lifetime defined as the time duration of such increased population at such metastable state with such defined time terminating upon spontaneous relaxation, characterized in that said apparatus includes a second means designated "associated radiation means" for making associated radiation incident upon said element, said associated radiation including energy of a quantum level to further excite the said medium from the metastable state to a first higher excited state whereby at least a portion of such associated radiation is absorbed with an associated extinction ratio greater than 99%, together with third means responsive to a change in radiation amplitude of said associated radiation due to absorption resulting from excitation from said metastable state to the said first higher excited state, the apparatus further characterized in that the population of said metastable state varies in time over a time period of approximately 10 picoseconds in a manner representative of intelligence, whereby the said associated radiation is altered in a manner representative of the said intelligence, said intelligence being thereby replicated at the said third means.

2. Apparatus of claim 1 in which said first excitation means comprises a radiation means.

3. Apparatus of claim 2 in which said radiation means emits radiation including energy of a quantum level to produce direct excitation to said metastable state.

4. Apparatus of claim 3 in which the said metastable state and the said first higher excited state are within a single multiplet.

5. Apparatus of claim 4 in which the single multiplet is the ground state singlet multiplet.

6. Apparatus of claim 5 in which the energy difference between the said metastable state and first higher excited state corresponds with radiation of a wavelength beyond that of radiation contained within the visible spectrum.

7. Apparatus of claim 6 in which the said wavelength is in the infrared spectrum.

8. Apparatus of claim 1 in which said first excitation means includes a first portion for increasing energy from the said metastable state to a second higher excited state, which second higher excited state is at an energy level above that of the said metastable state.

9. Apparatus of claim 8 in which the said medium is characterized by energy levels which permit reduction of energy from said second higher excited state to said metastable state by relaxation.

10. Apparatus of claim 9 in which relaxation includes at least one radiationless transition.

11. Apparatus of claim 10 in which the said medium is characterized by a permitted transition from said second higher excited state to a metastable state of a multiplicity differing from that containing the said second higher excited state.

12. Apparatus of claim 11 in which said metastable state and said first higher excited state are both quantum mechanical triplet states.

13. Apparatus of claim 12 in which excitation from said metastable state to said first higher excited state is a single photon event.

14. Apparatus of claim 12 in which excitation from said metastable state to said first higher excited state is a multiphoton event.

15. Apparatus of claim 12 in which the said associated radiation means emits radiation characterized by a rise and fall in amplitude of a time interval less than that of the said population lifetime.

16. Apparatus of claim 15 in which the said associated radiation means produces pulsed radiation of such pulse rate that more than one pulse is produced within the said population lifetime.

17. Apparatus of claim 12 in which the said associated radiation means is a cw radiation source.

18. Apparatus of claim 8 in which said excitation means produces radiation including a second portion for stimulating a reduction in energy from said second higher excited state to said metastable state.

19. Apparatus of claim 18 in which said second portion produces stimulated emission.

20. Apparatus of claim 19 in which said second portion is pulsed and in which means is provided for time selection so as to produce stimulated emission of wavelength dependent upon such time selection.

21. Apparatus of claim 1 in which said second means is a cw radiation source.

22. Apparatus of claim 21 in which the third means includes a binary detector.

23. Apparatus of claim 21 in which the said third means includes an analog detector.

24. Apparatus of claim 21 in which the said second means comprises a cw laser.

25. Apparatus of claim 1 in which said second means is a pulse source.

26. Apparatus of claim 25 in which said pulse source is a pulsed laser.

27. Apparatus of claim 26 in which said pulsed laser is a mode-locked laser.

28. Apparatus of claim 1 in which the said first excitation means populates said metastable state in a time varying manner representative of information, whereby such information is replicated at the said third means as a corresponding amplitude variation.

29. Apparatus of claim 28 in which the said third means comprises a digital detector.

30. Apparatus of claim 28 in which the said third means comprises an analog detector.

31. Apparatus of claim 1 in which said excitation means includes a medium for increasing wavelength content via Stokes and anti-Stokes transformations and in which said third means includes wavelength selecting element.

32. Apparatus of claim 1 in which said third means comprises a transmission medium.

33. In a communication system, an apparatus including an element comprising an active medium, said active medium being characterized by quantum mechanical energy levels, together with first excitation means for exciting said active medium so as to increase population a at least one elevated quantum mechanical energy level to a population above that evidenced by the said medium when the medium is at thermodynamic equilibrium, the increased population at the said elevated level resulting in "metastable state", said metastable state having an associated population lifetime defined as the time duration of such increased population at such metastable state with such defined time terminating upon spontaneous relaxation, characterized in that said apparatus includes a second means designated "associated radiation means" for making associated radiation incident upon said element, said associated radiation including energy of a quantum level to further excite the said medium from the metastable state to a first higher excited state whereby at least a portion of such associated radiation is absorbed, together with third means responsive to a change in radiation amplitude of said associated radiation due to absorption resulting from excitation from said metastable state to the said first higher excited state, the apparatus further characterized in that the population of said metastable state varies in time in a manner representative of intelligence, whereby the said associated radiation is altered in a manner representative of the said intelligence, said intelligence being thereby replicated at the said third means, the apparatus further characterized in that said excitation means includes a medium for increasing wavelength content via Stokes and anti-Stokes transformations and in which said third means includes a wavelength selecting element.

* * * * *